United States Patent Office 3,214,972
Patented Nov. 2, 1965

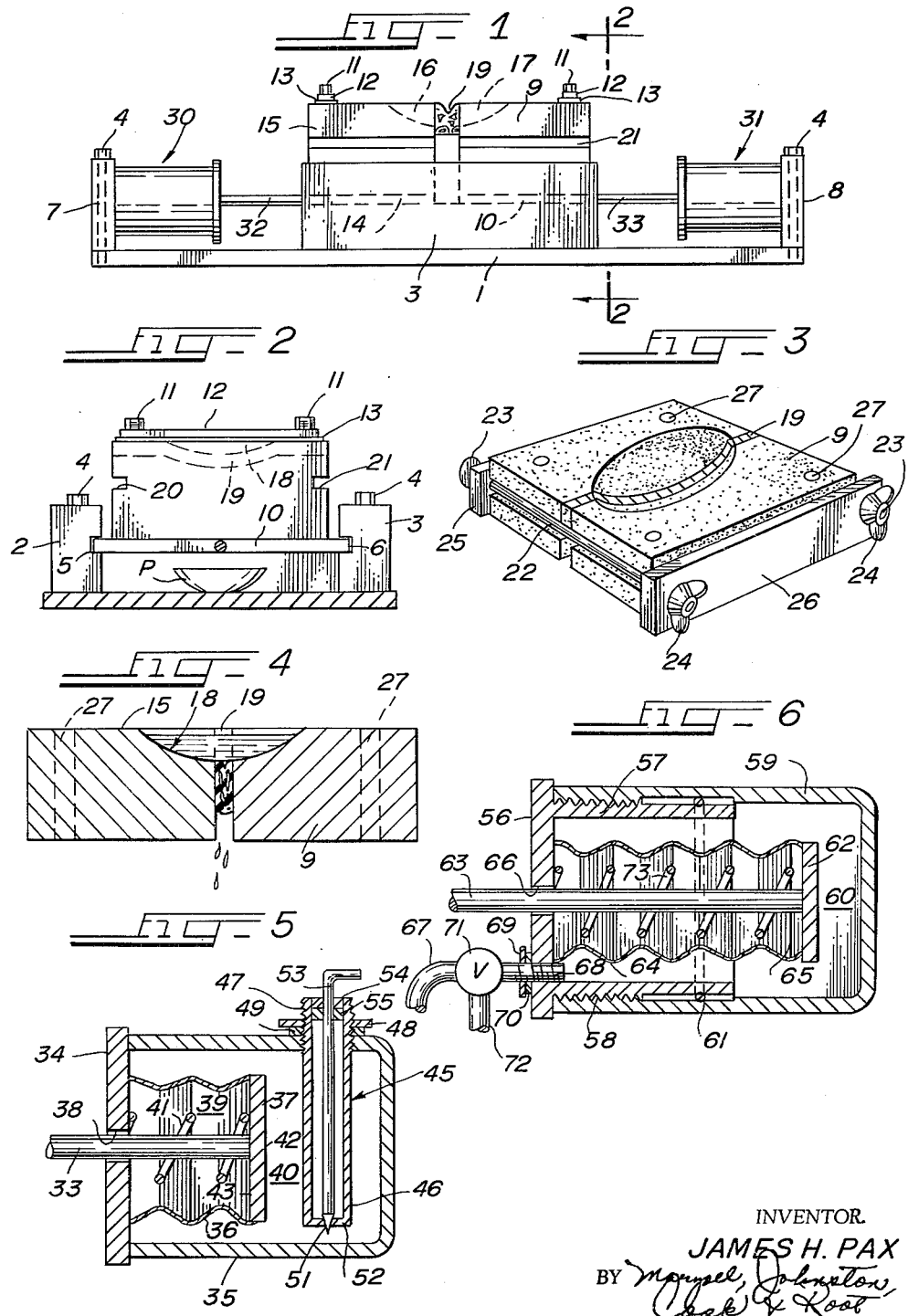

1

3,214,972
TESTING MACHINES HAVING DRIVE MEANS RESPONSIVE TO ENVIRONMENTAL TEMPERATURE CHANGES
James H. Pax, Rudolph, Ohio, assignor to The D. S. Brown Company, North Baltimore, Ohio, a corporation of Ohio
Filed Oct. 1, 1963, Ser. No. 312,977
8 Claims. (Cl. 73—150)

This invention, in general, relates to testing machines. More particularly, the invention pertains to machines useful in the testing of the sealing properties of elastomer strips or caulk-type joint sealants under varying temperatures and stresses. The invention particularly pertains to machines adapted for the testing of elastomer strips and caulk-type joint seals under dynamic testing conditions simulating field conditions.

Considerable attention has been given in recent years to the use of elastomeric, compressible strips as seal strips in concrete joints of highways and bridges. These compressible, resilient strips are used to seal highway and bridge expansion and contraction joints against intrusion of water, dirt and the like into the expansion joints. The strips compress and expand as the expansion and contraction joint expands and contracts under variable climatic temperature conditions. Semisolid, caulk-type joint seals include the known asphalt elastomer mixture used to seal expansion and contraction joints as well as other caulking compositions. Caulk-type joint seals are quite different in function, however, from the elastomer strip joint seals as will be discussed hereinafter.

The testing machines of the invention may be employed to test or screen various elastomer compositions or structures of elastomer compositions in the form of elastomer strips or to test or screen various caulk-type joint sealants. The objective of these tests is to evaluate their potential properties as sealing strips or caulking seals in highway joints, bridges, building joints, and the like wherein an expansion and contraction type joint is employed, which joint must be sealed against intrusion of water, dirt, and the like in all states of expansion or contraction of the joint.

The testing machines of this invention are of the dynamic type wherein the joint provided on the test machine expands and contracts with changing temperature conditions to which the test machine is subjected in accordance with the approximate changes in terms of expansion and contraction of the joints which would be experienced in actual field conditions under the same temperature variables.

In the case of the elastomer seal strips, one of the properties which is determined by employing the test machines of the invention is the property of elastic recovery of the strip after it has been subjected to the maximum anticipated compression and is allowed to expand as the joint opens.

Elastomer seal strips, as a general rule, are most critically adversely affected in terms of their elastic recovery or resilience upon lateral expansion of the strip at cold temperatures. The strips have a poorer elastic recovery from compression when cold than when warm. Accordingly, the test procedures herein set forth are made with the objective of testing the strips by simulating the actual or anticipated field conditions at which the sealing function of strip usually breaks down.

As an example of an actual field condition for a highway in which the expansion and contraction joints are sealed or to be sealed by the elastomer strip under test, assume a warm, sunny winter day in which the concrete sections are warmed by both the warm air and by radiation from the sun. The joints are well contracted under this condition. There is a sudden temperature drop in late afternoon or early evening to a temperature in the range of 0° F. to −65° F. The elastomer strips become cold quickly, and the highway sections cool and contract. The joints begin to open, and the cold elastomer strips must expand laterally to maintain the seal between the side walls of the strips and the side walls of the joints. This is a critical area in which the strip must expand laterally under most adverse conditions in terms of its lateral elastic recovery.

In tests conducted with the machines of this invention on the elastomer seal strips, the dynamic conditions of expansion and contraction under variable temperature conditions are simulated in that the machine is constructed in a manner whereby the strip between the test blocks of the machine is compressed when the machine is placed in an environment wherein the temperature is relatively high, e.g., in the range of 90–130° F., and the strip is allowed to expand as the joint opens when the test machine is placed in a cold environment, e.g., an environment with the temperature in the range of 0° F. to −65° F. It is possible to even subject the strip to higher temperatures by placing the strip (preferably in about its maximum compressed state) in an environment for the high temperature cycle of the test with the temperature in the range of 150–230° F. in order to accelerate the heat aging of the strip. This accelerated aging has the advantage of cutting down the over-all test time.

In any case, the machine is adapted to be used under conditions wherein the alternating cycles of hot and cold temperatures are employed in order to subject the strip to alternating expansion and contraction. The holding time in the cold stage of the temperature test need only be the holding time necessary to be sure that the strip, as well as the compression blocks in contact therewith, are at the environment temperature. The time of holding at the higher temperature range may be any selected time. In the accelerated aging test the time range ordinarily falls in the range of 48–120 hours total time in which the strip is subjected to the higher temperatures in the approximate maximum compressed state.

The tests hereafter described simulate such conditions and preferably are even somewhat more severe than would be the worst anticipated field condition. The collection of data on the sealing qualities of the strip with lateral expansion of the strip at the selected cold test condition preferably is made first on the strip before it is subjected to aging by heat. The strip is then aged at high temperature in an oven with the strip under about maximum anticipated compression. The reason for compressing the strip to about maximum anticipated compression during the aging step is that in field use the strip would be under the same conditions when it is at its highest temperature, the joints being contracted or closed the greatest amount when the highway concrete sections are the hottest. The test methods, however, can be used, though not as effectively in terms of duplication of field conditions for measuring the effect of permanent set due to heat aging of the elastomer, with the aging done at substantially less than maximum anticipated compression.

After the heat aging step, the strip is tested again at the cold temperature by the cold temperature procedure previously described. By comparing the data obtained both prior to and after aging for percent of recovery of the original width of the strip under cold temperature lateral expansion of the strip as the test machine joint expands up to the point of loss of seal against liquid penetration, the effect of aging on the strip can be measured. This data can be very helpful in future research to find modified or new compounding measures for vulcanizable elastomer compositions and/or modification of the physical structures of the strips to improve the over-all quality of the strips.

The machine and test procedures aforedescribed may also be used to ascertain the sealing properties of caulk-type, semi-solid, expansion and contraction joint seals for highways, bridges, buildings, airstrips, etc. A well known caulk-type, highway seal is the asphalt seal made by pouring hot, liquid asphalt into the joint. Upon cooling, the asphalt becomes a semi-solid mass with cold flow properties. Similar semi-solid seals are made with mixtures of asphalt and elastomers such as natural rubber or synthetic elastomers (e.g., butyl rubber, butadiene-styrene copolymers, neoprene, etc.). The elastomers improve the flexibility and resilience of the asphaltic-type seal.

The caulk-type, semi-solid seals behave somewhat differently from the elastomer seals heretofore discussed in that they have little or essentially no elastic resilience when compressed. The caulk-type seal relies upon adhesion of the caulking composition to the side walls of the joint to maintain the seal as the expansion and contraction joint opens. In theory, the seal is stretched as the joint opens in cold weather and returns to the normal state as the joint contracts in hot weather. I practice, however, the caulking seal usually either pulls away from the one or both of the side walls of the joint or cracks down the middle. These cracks in the seals themselves or between the seal and the side walls of the joints fill with highway dirt and other solids, reducing the compressibility of the caulking seal. The ultimate result of build up of such solids in the cracks, if left uncorrected, is a joint seal filled with enough incompressible solids so that the seal will not compress enough in hot weather, as the concrete highway sections or the like expand, to take up the expansion. Pressures in the concrete sections develop sufficient magnitude to cause the concrete to break.

It will be apparent, therefore, that laboratory testing of caulking-type seals, as well as the laboratory testing of elastomer, dry-type seals heretofore discussed, is of practical value. The tests are conducted by essentially the same procedure as the cold temperature (0° F. to —65° F.) test. Aging of the seal at high temperature, of course, has no purpose with asphalt-type seals, but the seal may be subjected to and/or tested at high temperatures (e.g., 100–140° F.) if desired.

As an example of a testing procedure with a caulking-type seal, hot asphalt is poured into a joint between concrete blocks with the joints spaced apart at the normal, anticipated spacing between concrete sections of a highway or bridge joint. The test machine is placed in a cold box, refrigerated room, etc., maintained at a preselected temperature in the range of 0° F. to —65° F., e.g., —30° F. When the concrete blocks and seal are at equilibrium with the cold atmosphere, the test machine drive is activated. Prior thereto, antifreeze liquid is placed in the depression. A movable block moves away from another block at a slow, predetermined rate. When the liquid seeps through the seal, the test is stopped. The spacing between the concrete blocks at the point of loss of liquid seal is recorded. Other observations of value which can be made during the test are notations as to surface cracks formed in the seal as the joint expands, cause of loss of liquid seal (e.g., separation of a wall or walls of the concrete block and the caulking seal or a break in the middle of the seal), and like data which will be of value in future research for improving performance of the seal.

Briefly, the dynamic test machines of the invention comprise a pair of blocks movable toward and away from each other. One block may be fixed and the other may be movable, or both blocks may be movable, as desired. An elastomer strip is inserted and held between the adjacent faces of the two blocks or a caulking-type seal is placed between the adjacent faces of the two blocks to simulate an expansion and contraction joint sealed either with an elastomer strip or caulk-type seal.

The movable block or blocks are mounted on a movable element or plate of the machine, which in turn is reciprocally movable by temperature responsive power means, which in the preferred embodiment of the invention is a hermetically sealed bellows chamber.

In accordance with a preferred embodiment of the invention, the two blocks with an elastomer strip compressed therebetween may be held together as a unit by an auxiliary frame structure attached to the blocks after the strip has been compressed by machine to the desired state. The two blocks and the frame structure may then be removed as a unit from the machine and placed in the heat aging chamber wherein the strip in the compressed state is subjected to the desired aging temperature.

The upper, adjacent corners of the test blocks preferably ar cut away so as to form depressions when the blocks are juxtapositioned with a strip compressed therebetween. This depression is adapted to hold a test liquid such as an antifreeze liquid, e.g., a mixture of water and ethylene glycol. The blocks are slowly moved apart, e.g., by retracting the movable block away from the fixed block or retracting both blocks. When the liquid in the depression begins to leak through between the joint between the sides of the elastomer strip and the contacting face of the test block or blocks, the distance between the blocks is measured. This test measures the point at which the elastic strip or the caulking seal loses its sealing function in relation to the side walls of the test blocks.

A preferred embodiment of the test machine of the invention is illustrated in the drawing wherein:

FIG. 1 is a side elevation thereof;

FIG. 2 is a cross-section taken on section 2—2 of FIG. 1;

FIG. 3 is a perspective view of a test block and frame assembly thereon which may be used in a portion of the test procedures of the invention;

FIG. 4 is a transverse cross-section of the test blocks at the seal leakage stage of the test procedures;

FIG. 5 is a diametric cross-section through an embodiment hermetically sealed bellows chamber which may be employed in the illustrated embodiment; and FIG. 6 is a diametric cross-section through an alternate embodiment of a bellows chamber.

Referring to the drawing, which illustrates a preferred embodiment of the invention, there is shown a flat frame plate 1. A pair of frame blocks 2, 3 are bolted by the bolts 4 to the frame plate 1 along opposite edges thereof. The frame blocks 2, 3 are parallel and contain in their inward, opposing faces grooves 5, 6. The grooves 5, 6 form slide tracks for a movable plate carrying the movable testing block, hereafter described.

In addition to the frame plate 1 and the frame blocks 2, 3, the machine frame further comprises two end frame bars or plates 7, 8, attached to the frame plate 1 by bolts 4. These frame bars extend across opposite ends of the frame plate 1 between the frame blocks 2, 3. The frame bars 7, 8 function as mounting members for mounting the hermetically sealed bellows for moving the test blocks as hereinafter described.

A test block 9, e.g., a concrete block, is fixedly but removably attached to the movable plate 10 by means of bolts 11 extending through the block 9, a cross plate 12, and a synthetic rubber pad 13, e.g., silicone rubber, and threadedly secured in the movable plate 10. The test block 9 is thus reciprocally movable with the movable plate 10. The rubber pad 13 spreads the force of bolts 11 and prevents accidental breakage of the concrete blocks when the bolts are tightened.

The other test block of the test machine comprises a movable plate 14 slidably mounted in the grooves 5, 6 in the frame blocks 2, 3. A test block 15, e.g., a concrete block, is fixedly attached to the movable plate 14 by means of bolts 11 extending through the test block 15, a cross plate 12, and a synthetic rubber pad 13. The bolts 11 are threaded in tapped holes in the plate 14. The movable plates 10, 14 are spaced above the base plate 1 sufficiently to allow a shallow pan P to be placed between the plates, the shallow pan being used to collect liquid leakage in the test procedure hereinafter described.

The contiguous, upper corners of the test blocks 9, 15 have cut away segments 16, 17 forming a depression 18, e.g., an oval depression, when the blocks are juxtapositioned with the elastomer strip 19 (or caulk-type seal) under test compressed therebetween. The elastomer strip 19 (or caulk-type seal) is inserted between the blocks in a manner whereby the strip or seal substantially follows the contour of the juxtapositioned upper surfaces of the blocks 9, 15. It is preferably held in the space between the blocks at a distance slightly below, e.g., ⅛″, below the upper surface of the juxtapositioned blocks.

The test blocks 9, 15 have in their opposite sides inwardly-directed slots or grooves 20, 21. These slots or grooves accommodate the shanks 22 of bolts 23 having on their threaded ends a threaded nut, e.g., the wingnuts 24. The shanks 22 of the bolts extend through bars or plates 25, 26 positioned across opposite ends of the test block assembly (FIG. 3). The bolts and bars or plates 25, 26 form frame assembly which can be attached to the test block assembly on the machine when the elastomer strip is compressed between the test blocks 9, 15. By tightening the bars or plates 25, 26 against the ends of the test blocks, the test block assembly with the resilient strip 19 compressed therebetween can be locked in the frame assembly. The test block assembly can then be removed from the machine by removing bolts 11. The four holes 27, shown in the test block assembly of FIG. 3, are the holes in the test blocks through which said bolts extend.

The movement of the test blocks toward each other in the heating or aging cycle of the test is not of great or critical importance, however. The oven treatment is primarily an accelerated aging treatment of the elastomer seal strip, and it can be done with the strip held in the previously described frame assembly to conserve space in the oven. Before allowing the aged seal strip to expand, it is taken down to the cold test temperature. The prime purpose of this type of test is the collection of data on cold flexibility movement or resilience of the rubber in cold temperature, compression and permanent set due to the aging, the determination of positive sealing by having a liquid on top of the seal utilizing the actual, finished seal.

The test conditions employed are actually somewhat more severe than the anticipated field conditions in that the accelerated aging done under maximum compression of the seal is at a higher temperature than would be the temperature of the seal under maximum compression in field use. The calculated, anticipated amounts of expansion and/or contraction of a given size of seal strip in the test machine may be calculated for reinforced concrete from a base of 70° F. If desired, the test machine unit may include a series of interchangeable hermetically sealed drive members of different hermetic chamber volumes and/or piston diameters so as to provide a selection of hermetically sealed drive units. The unit selected is the one providing the closest increment of movement of the test blocks per given unit of temperature change anticipated for a given seal under given anticipated field conditions.

When testing elastomer strips as highway or bridge concrete joint seals, the test blocks 9, 15 preferably are concrete blocks so that the surfaces of the blocks which contact the elastomer strips are comparable texture to concrete highway or bridge sections. Where the strips being tested are intended for use as sealing strips or gaskets between other types of surfaces, other materials may be selected as the test blocks. Where relatively smooth surfaces are involved, metal blocks or the like may be used.

The movement of the test blocks 9, 15 toward and away from each other is achieved by the use of power means responsive to the temperature of the environment in which the test machine is placed so as to cause the test blocks to move toward each other upon a temperature rise of the surrounding environment and to cause the test blocks to separate upon an environmental temperature decrease. The machine, therefore, responds in compressing or decompressing the seal strip or caulk seal in the same fashion as it would be compressed or decompressed in field use, e.g., in a highway expansion and contraction joint.

A power device eminently suitable for this purpose is a hermetically sealed bellows chamber. The latter may be linked mechanically to the movable support for only one block, in the case where one block is fixed and the other is movable; or, as in the illustrated embodiment, a bellows chamber is linked mechanically to each block, which blocks are movable toward and away from each other.

The bellows chambers 30, 31, respectively, are rigidly mounted on the support bars 7, 8 of the machine frame. The temperature responsive mechanism of the bellows chambers 30, 31 are connected by rods 32, 33 to the movable plates 14, 10, respectively.

The details of two bellows chambers useful in the combination of the invention are illustrated in FIGS. 5 and 6. In the embodiment of FIG. 5, the bellows chamber comprises a base 34 on which is mounted in hermetically sealed relationship a cup 35 to form a bellows enclosure. A strong, but flexible, walled bellows 36, i.e., a stainless steel bellows, is hermetically joined at one end thereof to the base 34 and is hermetically joined at the other end thereof to a disc-shaped piston 37. The latter is connected to the rod 33 (or 32, as the case may be) and extends through a hole 38 in the base 34.

The bellows operates as follows. The piston 37 is at equilibrium when the force exerted by the gas in hermetically sealed chamber 40 against the outer face 42 of the piston equals the sum of the forces exerted against the undersurface of the piston by the coil spring 41 and the atmospheric pressure against the underface 43. Should the environmental temperature increase, the gas in hermetically sealed chamber 40 is warmed by heat conduction through the walls of cup 35. This results in a pressure rise in chamber 40—moving the piston 37 toward base 34 until equilibrium as aforedefined is regained. This movement of the piston is transmitted by rod to the plate 10 or plate 14, as the case may be, to move blocks 9 and 15 toward each other and compress the strip 19 therebetween. The expansion of highway concrete sections or the like and the corresponding contraction of expansion and contraction joints therebetween is thereby simulated on the test machine.

Conversely, when the environment surrounding the machine cools, the gas in chamber 40 is cooled, and its pressure drops. The piston 37 and rod 33 move away from base 33 under the urging of spring 41. The blocks 9, 15 separate to simulate the opening of an expansion and contraction joint as the highway sections or the like contract upon cooling.

Preferably, the bellows chambers are connected to a gas reservoir serving the function of controlling the stroke of piston 37. In the embodiment of FIG. 5, the gas reservoir 45 comprises a cartridge 46 containing gas under relatively high pressure. The outer wall of the cylindrical cartridge has threads 47 at least toward its outer end, which threads are threaded into a tapped hole in the wall of cup 35.

The outer end of cartridge 45 has a flange 48 which bears against elastomer seal ring 49 to form a gas-tight joint at the tapped hole. The cartridge further has a valve operable from the outer end thereof to open and close a gas exit passage in the cartridge. In the illustrated case, the valve is a needle valve 50 having a tapered tip 51 seated in a matingly tapered opening in the end wall 52 of cartridge 46. The valve may be opened or closed by virtue of its threaded connection of threads 53 in a tapped hole in the cap 54 of the cartridge. Suitable packing 55 or the like is provided to make the cap and valve structure gas-tight.

When the valve 50 is turned to withdraw the tip 51 from its seated position, the pressurized gas in cartridge 46 flows into chamber 40 to increase its gas pressure. The piston 37, under the increase in pressure, moves toward base 34 until valve 50 is closed. By this means, the spacing between blocks 9, 15 can be altered to any desired spacing at any preselected temperature, thereby adjusting the stroke zone of piston 37 and the block mechanically connected therewith. Should it be desired to release some of the gas pressure in the chamber 40, this can be done expediently by turning cartridge 46 sufficiently to permit gas to escape through its threaded connection in cup 35. The fit of rod 33 in hole 38 is one which does not provide a hermetic seal whereby the chamber 39 inside bellows 36 assumes the pressure of the surrounding atmosphere.

The chamber 40 inside cup 35, but outside bellows 36, on the other hand, is hermetically sealed. Chamber 40 is filled with a suitable gas, the pressure of which increases or decreases directly with a temperature change in the gas.

The piston 37 is urged into chamber 40 by the coil spring 41 which acts against the undersurface of piston 37 and the inner side of base 34.

The bellows chamber of FIG. 6, while structurally different from that of FIG. 5, functions in a similar fashion. It comprises a base 56 having an outwardly extending cylindrical wall 57 threaded at its base 58. A cup member 59 is seated about and is threaded on wall 57 to form a chamber 60 which is hermetically sealed by O-ring 61. The piston 62, piston rod 63, and stainless steel bellows 64 are like those previously described. Bellows 64 is hermetically sealed to piston 62 and base 66. The chamber 65 inside bellows 64 is in communication with the atmosphere by virtue of a nongas-tight fit between hole 66 and rod 63.

If desired, bellows chamber 63 can be connected with a reservoir of pressurized gas (not shown) located outside the bellows chamber. The reservoir is connected to a tube 67 having a fitting 68 threaded in a tapped hole in base 56. The fitting has a flange 69 bearing against seal ring 70 to provide a gas-tight joint. The tube 67 has a valve, preferably a two-way valve 71, to close off communication between the reservoir and chamber 60 and also to provide selective communication between the chamber 60 and the reservoir to increase gas pressure in chamber 60 or between chamber 60 and the atmosphere via vent tube 72 to release gas pressure in chamber 60. The aforedescribed structure serves the same function as described re cartridge 46 in adjusting the stroke zone of the piston 62, which is resiliently biased by coil spring 73.

The testing of the suitability of a particular elastomer strip or caulking-type seal as a concrete joint seal or the like is conducted on the machine illustrated in the drawings by the following procedure.

The blocks 9, 15 are separated enough to insert an elastomer strip 19 therebetween with the upper surface of the strip substantially flush with or slightly below the contour of the adjacent, upper surfaces of the blocks. In the case of a caulking strip, the caulking strip is poured into the joint to form a caulking seal having its upper surface substantially flush with or slightly below the contour of the adjacent, upper surfaces of the blocks. The movable blocks 9, 15 are moved toward each other by placing the machine in a high temperature environment which causes the bellows to move the two blocks toward each other to a state wherein the elastomer strip of the caulking seal is compressed to about the maximum amount of compression anticipated in field use. At this stage, the machine is then placed in the cold temperature environment so that the test blocks again begin to separate as the bellows proceed toward equilibrium with the cold temperature environment. At the same time, the joint seal or elastomer strip and the test blocks are cooled because of the cold environment.

The cold environment may be at or may be brought ultimately to a subfreezing temperature in the range of about 0° F. to −65° F. in a cold box, refrigerator chamber or room, etc.

A liquid L which will not freeze at the low test temperature is placed in the depression 18 before placing the machine in the cold environment or shortly thereafter. A mixture such as a 50–50 mixture of water and ethylene glycol may be used, for example. The machine is observed during this stage of the testing and, when the liquid L in depression 18 begins to leak between the contacting wall or walls of the test blocks and the elastomer strip or caulking seal 19 (FIG. 4), the distance between the blocks is measured to ascertain the degree of elastic recovery of the elastomer strip up to the point where its liquid-tight seal with the test blocks is lost.

The caulk-type, semi-solid seals behave somewhat differently from the elastomer seals heretofore discussed in that they have little or essentially no elastic resilience when compressed. The caulk-type seal relies upon adhesion of the caulking composition to the side walls of the joint to maintain the seal as the expansion and contraction joint opens. In theory, the seal is stretched as the joint opens in cold weather and returns to the normal state as the joint contracts in hot weather. In practice, however, the caulking seal usually either pulls away from the one or both of the side walls of the joint or cracks down the middle. These cracks in the seals themselves or between the seal and the side walls of the joints fill with highway dirt and other solids, reducing the compressibility of the caulking seal. The ultimate result of build up of such solids in the cracks, if left uncorrected, is a joint seal filled with enough incompressible solids so that the seal will not compress enough in hot weather, as the concrete highway sections or the like expand, to take up the expansion. Pressures in the concrete sections develop sufficient magnitude to cause the concrete to break.

As an example of a testing procedure with a caulking-type seal, hot asphalt is poured into a joint between concrete blocks 9, 15 with the joint spaced apart at the smallest, anticipated spacing between concrete sections of a highway or bridge joint, with the test machine in a warm environment of preselected temperature. The test machine is placed in a cold box, refrigerated room, etc., maintained at a preselected temperature in the range of 0° F. to −65° F., e.g., −30° F. Antifreeze liquid L is placed in the depression 18. Movable blocks 9, 15 move away from each other as the cool environment cools the gas in the hermetic chambers of the bellows drive devices. When the liquid seeps through the seal, the test is stopped. The spacing between the concrete blocks at the point of loss of liquid seal is recorded. Other observations of value which can be made during the test are notations as to surface cracks formed in the seal as the joint expands, cause of loss of liquid seal (e.g., separation of a wall or walls of the concrete block and the caulking seal or a break in the middle of the seal), and like data which will be of value in future research for improving performance of the seal.

Thus, the test machines and test methods herein defined provided dynamic test conditions simulating field use of elastomer strips as joint seals between expanding and contracting sections. Considerable time and expense can be saved by the employment thereof in screening and evaluating various elastomer compositions and/or various elastomer strip structural styles for a given field use. Similar, valuable, experimental data can be obtained in tests with caulk-type, semi-solid seals.

The invention is hereby claimed as follows:

1. A testing machine adapted to be placed in variable temperature environment comprising a frame, a first block and a second block mounted on said frame for relative horizontal movement of at least one of said blocks toward and away from the other block, and drive means responsive to the temperature of the environment surrounding said machine operatively connected to the movable block for moving the last-mentioned block toward said other block upon an increase in the temperature of said environment and away from said other block upon a decrease in the temperature of said environment.

2. A testing machine as claimed in claim 1 wherein the upper surfaces of said blocks are recessed to form together with a seal strip held between said blocks adjacent said upper surfaces a liquid-receiving depression.

3. A testing machine adapted to be placed in variable temperature environment comprising a frame, a first block and a second block with opposing faces, said blocks being mounted on said frame for relative movement toward and away from each other, and drive means responsive to the temperature of the environment surrounding said machine operatively connected to said blocks for moving said blocks toward each other upon an increase in temperature of said environment and away from each other upon a decrease in temperature of said environment.

4. A testing machine adapted to be placed in variable temperature environment comprising a frame including a pair of parallel, spaced frame members, guide means on said frame members, a first plate, a second plate substantially coplanar with said first plate, said plates extending between said frame members and being mounted on said guide means for horizontal movement toward and away from each other, a first block mounted on said first plate, a second block mounted on said second plate, and drive means responsive to the temperature of the environment of said machine operatively connected to said blocks for moving said blocks toward each other upon an increase in temperature of said environment and away from each other upon a decrease in temperature of said environment.

5. A testing machine as claimed in claim 4 wherein the upper surfaces of said blocks are recessed to form together with a seal strip held between said blocks adjacent said upper surfaces a liquid-receiving depression.

6. A testing machine as claimed in claim 1 wherein said drive means comprises a hollow member having a piston reciprocable therein, means including a piston rod operatively connecting said piston and said movable block, and means in said hollow member forming a hermetically sealed chamber in which the piston is a movable wall of said chamber and is moved by pressure changes resulting from temperature changes of a gas in said chamber, which changes are induced by changes in said temperature of said environment.

7. A testing machine as claimed in claim 1 wherein said drive means comprises a cup member, a piston axially reciprocable in said cup member, a tubular bellows member inside said cup member and hermetically sealed at one end thereof to said piston, means hermetically sealing the other end of said bellows member and said cup member to form a gas-filled, hermetically sealed space inside said cup member between it and the outside of said bellows member and said piston, means communicating the inside of said bellows with the atmosphere, a piston rod extending from said piston through said bellows member, and means connecting said piston rod to said movable block for moving said movable block toward said other block upon rise of temperature of the gas in said hermetically sealed space and away from said other block upon drop in temperature of the gas in said hermetically sealed space.

8. A testing machine as claimed in claim 7, and means adapted to supply gas under pressure from a pressurized gas reservoir to said hermetically sealed space to move said piston and thereby adjust the spacing between said blocks at a given environmental temperature.

References Cited by the Examiner
UNITED STATES PATENTS

| | | | |
|---|---|---|---|
| 2,283,743 | 5/42 | Lessig | 73—91 X |
| 2,601,782 | 7/52 | Foreman et al. | 73—150 |
| 3,041,821 | 7/62 | Lindberg | 73—339 X |

RICHARD C. QUEISSER, *Primary Examiner.*

DAVID SCHONBERG, *Examiner.*